United States Patent
Guo et al.

(10) Patent No.: US 9,756,081 B2
(45) Date of Patent: *Sep. 5, 2017

(54) CONTEXT-AWARE PATTERN MATCHING ACCELERATOR

(71) Applicant: Fortinet, Inc., Sunnyvale, CA (US)

(72) Inventors: Zhi Guo, San Jose, CA (US); Hongbin Lu, San Jose, CA (US); Xu Zhou, San Jose, CA (US); Lin Huang, Saratoga, CA (US); Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,418

(22) Filed: Aug. 13, 2016

(65) Prior Publication Data
US 2017/0041348 A1 Feb. 9, 2017

Related U.S. Application Data

(63) Continuation of application No. 14/791,363, filed on Jul. 3, 2015, now Pat. No. 9,491,143, which is a
(Continued)

(51) Int. Cl.
*H04L 12/28* (2006.01)
*H04L 29/06* (2006.01)
(Continued)

(52) U.S. Cl.
CPC .............. *H04L 63/20* (2013.01); *G06F 21/56* (2013.01); *G06F 21/564* (2013.01);
(Continued)

(58) Field of Classification Search
None
See application file for complete search history.

(56) References Cited

U.S. PATENT DOCUMENTS 5,448,045 A   9/1995 Clark
5,481,693 A   1/1996 Blomgren et al.
(Continued)

OTHER PUBLICATIONS

Non-Final Rejection for U.S. Appl. No. 14/810,870 mailed Dec. 5, 2016.
(Continued)

*Primary Examiner* — Bob Phunkulh
(74) *Attorney, Agent, or Firm* — Hamilton, DeSanctis & Cha LLP

(57) ABSTRACT

Methods and systems for improving accuracy, speed, and efficiency of context-aware pattern matching are provided. According to one embodiment, a packet stream is received by a first stage of a CPMP hardware accelerator of a network device. A pre-matching process is performed by the first stage to identify a candidate packet that matches a string or over-flow pattern associated with IPS or ADC rules. A candidate rule is identified based on a correlation of results of the pre-matching process. The candidate packet is tokened to produce matching tokens and corresponding locations. A full-match process is performed on the candidate packet by a second stage of the CPMP hardware accelerator to determine whether it satisfies the candidate rule by performing one or more of (i) context-aware pattern matching, (ii) context-aware string matching and (iii) regular expression matching based on contextual information, the matching tokens and the corresponding locations.

12 Claims, 13 Drawing Sheets

Related U.S. Application Data continuation of application No. 14/496,355, filed on Sep. 25, 2014, now Pat. No. 9,100,319, which is a continuation-in-part of application No. 14/143,156, filed on Dec. 30, 2013, now Pat. No. 8,819,830, which is a continuation of application No. 13/567,183, filed on Aug. 6, 2012, now Pat. No. 8,646,083, which is a continuation of application No. 12/644,794, filed on Dec. 22, 2009, now Pat. No. 8,239,950, which is a continuation of application No. 11/837,064, filed on Aug. 10, 2007, now Pat. No. 8,079,084.

(51) Int. Cl.
*H04L 12/727* (2013.01)
*H04L 12/801* (2013.01)
*G06F 21/56* (2013.01)
*G06F 21/71* (2013.01)

(52) U.S. Cl.
CPC ............ *G06F 21/567* (2013.01); *G06F 21/71* (2013.01); *H04L 45/121* (2013.01); *H04L 47/34* (2013.01); *H04L 63/0245* (2013.01); *H04L 63/145* (2013.01); *H04L 63/1408* (2013.01); *H04L 69/22* (2013.01); *H04L 63/0227* (2013.01)

(56) References Cited

U.S. PATENT DOCUMENTS

| | | |
|---|---|---|
| 5,598,546 A | 1/1997 | Blomgren |
| 5,623,600 A | 4/1997 | Ji et al. |
| 5,696,822 A | 12/1997 | Nachenberg |
| 5,799,163 A | 8/1998 | Park et al. |
| 5,948,104 A | 9/1999 | Gluck et al. |
| 5,951,698 A | 9/1999 | Chen et al. |
| 6,016,546 A | 1/2000 | Kephart et al. |
| 6,079,011 A | 6/2000 | Song |
| 6,195,587 B1 | 2/2001 | Hruska et al. |
| 6,272,616 B1 | 8/2001 | Fernando et al. |
| 6,449,658 B1 | 9/2002 | Lafe et al. |
| 6,578,140 B1 | 6/2003 | Policard |
| 6,615,166 B1 | 9/2003 | Guheen et al. |
| 6,671,791 B1 | 12/2003 | McGrath |
| 6,813,712 B1 | 11/2004 | Luke |
| 6,851,057 B1 | 2/2005 | Nachenberg |
| 6,920,542 B2 | 7/2005 | Gruner et al. |
| 6,971,019 B1 | 11/2005 | Nachenberg |
| 7,124,282 B2 | 10/2006 | Zandveld et al. |
| 7,210,168 B2 | 4/2007 | Hursey et al. |
| 7,363,655 B2 | 4/2008 | Franczek et al. |
| 7,367,057 B2 | 4/2008 | Das et al. |
| 7,409,718 B1 | 8/2008 | Hong et al. |
| 7,418,732 B2 | 8/2008 | Campbell et al. |
| 7,430,652 B2 | 9/2008 | Hundley |
| 7,454,418 B1 | 11/2008 | Wang |
| 7,549,055 B2 | 6/2009 | Zimmer et al. |
| 7,596,677 B1 | 9/2009 | Koryakin et al. |
| 7,624,436 B2 | 11/2009 | Balakrishnan et al. |
| 7,636,858 B2 | 12/2009 | Khan et al. |
| 7,644,246 B2 | 1/2010 | Peinado et al. |
| 7,673,343 B1 | 3/2010 | Barton et al. |
| 7,694,150 B1 | 4/2010 | Kirby |
| 7,761,605 B1 | 7/2010 | Rothwell et al. |
| 7,797,747 B1 | 9/2010 | Ferrie |
| 7,802,303 B1 | 9/2010 | Zhao et al. |
| 7,823,205 B1 | 10/2010 | Isenberg et al. |
| 7,854,008 B1 | 12/2010 | Huang et al. |
| 7,900,259 B2 | 3/2011 | Jeschke et al. |
| 8,010,667 B2 | 8/2011 | Zhang et al. |
| 8,079,084 B1 | 12/2011 | Huang et al. |
| 8,239,950 B1 | 8/2012 | Huang et al. |
| 8,347,389 B2 | 1/2013 | Kulkarni et al. |
| 8,375,449 B1 | 2/2013 | Zhou et al. |
| 8,443,450 B1 | 5/2013 | Zhou et al. |
| 8,560,862 B1 | 10/2013 | Zhou et al. |
| 8,646,083 B2 | 2/2014 | Huang et al. |
| 8,819,830 B2 | 8/2014 | Huang et al. |
| 8,839,439 B2 | 9/2014 | Zhou et al. |
| 8,850,586 B2 | 9/2014 | Zhou et al. |
| 9,100,319 B2 | 8/2015 | Guo et al. |
| 9,141,798 B2 | 9/2015 | Zhou et al. |
| 9,141,799 B2 | 9/2015 | Zhou et al. |
| 9,219,748 B2 | 12/2015 | Haung et al. |
| 9,355,251 B2 | 5/2016 | Zhou et al. |
| 9,411,960 B2 | 8/2016 | Huang et al. |
| 9,460,287 B2 | 10/2016 | Zhou et al. |
| 9,491,143 B2 | 11/2016 | Guo et al. |
| 2003/0033479 A1 | 2/2003 | Gruner et al. |
| 2004/0078580 A1 | 4/2004 | Hsu et al. |
| 2004/0158741 A1 | 8/2004 | Schneider |
| 2004/0250045 A1 | 12/2004 | Dowling |
| 2004/0255124 A1 | 12/2004 | Courcambeck et al. |
| 2005/0060541 A1 | 3/2005 | Angelo et al. |
| 2005/0102601 A1 | 5/2005 | Wells |
| 2005/0144203 A1 | 6/2005 | McCallum |
| 2005/0216759 A1 | 9/2005 | Rothman et al. |
| 2005/0216770 A1 | 9/2005 | Rowett et al. |
| 2006/0064755 A1 | 3/2006 | Azadet et al. |
| 2006/0077979 A1 | 4/2006 | Dubrovsky et al. |
| 2006/0107055 A1 | 5/2006 | Panwar et al. |
| 2006/0190612 A1 | 8/2006 | Kahol et al. |
| 2006/0200863 A1 | 9/2006 | Ray et al. |
| 2006/0288416 A1 | 12/2006 | Costea et al. |
| 2007/0033577 A1 | 2/2007 | Arackal |
| 2007/0261120 A1 | 11/2007 | Arbaugh et al. |
| 2008/0301670 A1 | 12/2008 | Gouge et al. |
| 2009/0150873 A1 | 6/2009 | Taneda |
| 2010/0138599 A1 | 6/2010 | Kim et al. |
| 2012/0203718 A1 | 8/2012 | Biran et al. |
| 2012/0203729 A1 | 8/2012 | Biran et al. |
| 2012/0203730 A1 | 8/2012 | Biran et al. |
| 2012/0203753 A1 | 8/2012 | Biran et al. |
| 2012/0203754 A1 | 8/2012 | Biran et al. |
| 2012/0203755 A1 | 8/2012 | Biran et al. |
| 2012/0203756 A1 | 8/2012 | Biran et al. |
| 2012/0203761 A1 | 8/2012 | Biran et al. |
| 2012/0203970 A1 | 8/2012 | Biran et al. |
| 2012/0317646 A1 | 12/2012 | Huang et al. |
| 2013/0152203 A1 | 6/2013 | Zhou et al. |
| 2014/0096254 A1 | 4/2014 | Zhou et al. |
| 2014/0143876 A1 | 5/2014 | Huang et al. |
| 2014/0237601 A1 | 8/2014 | Zhou et al. |
| 2014/0324530 A1 | 10/2014 | Thompson et al. |
| 2014/0351937 A1 | 11/2014 | Huang et al. |
| 2014/0359764 A1 | 12/2014 | Dubrovsky et al. |
| 2014/0380483 A1 | 12/2014 | Zhou et al. |
| 2015/0055481 A1 | 2/2015 | Guo et al. |
| 2015/0101054 A1 | 4/2015 | Zhou et al. |
| 2015/0269381 A1 | 9/2015 | Zhou et al. |
| 2015/0326534 A1 | 11/2015 | Guo et al. |
| 2016/0098559 A1 | 4/2016 | Huang et al. |
| 2016/0300062 A1 | 10/2016 | Huang et al. |

OTHER PUBLICATIONS

Notice of Allowance for U.S. Appl. No. 14/496,355 mailed Jun. 24, 2015.

Non-Final Rejection for U.S. Appl. No. 14/496,355 mailed Jan. 7, 2015.

Non-Final Rejection for U.S. Appl. No. 14/791,363 mailed Jun. 16, 2016.

Non-Final Rejection for U.S. Appl. No. 14/032,308 mailed Oct. 23, 2014.

Notice of Allowance for U.S. Appl. No. 11/837,064 mailed Nov. 8, 2011.

Final Rejection for U.S. Appl. No. 11/837,064 mailed Dec. 27, 2010.

Non-Final Rejection for U.S. Appl. No. 11/837,064 mailed Jul. 9, 2010.

Notice of Allowance for U.S. Appl. No. 12/644,794 mailed Jul. 5, 2012.

(56) References Cited

OTHER PUBLICATIONS

Final Rejection for U.S. Appl. No. 12/644,794 mailed Apr. 20, 2012.
Non-Final Rejection for U.S. Appl. No. 12/644,794 mailed Nov. 8, 2011.
Notice of Allowance for U.S. Appl. No. 13/567,183 mailed Oct. 28, 2013.
Non-Final Rejection for U.S. Appl. No. 13/567,183 mailed May 9, 2013.
Notice of Allowance for U.S. Appl. No. 14/143,156 mailed Jul. 21, 2014.
Notice of Allowance for U.S. Appl. No. 13/761,723 mailed Apr. 7, 2014.
Non-Final Rejection for U.S. Appl. No. 13/761,723 mailed Mar. 4, 2014.
Notice of Allowance for U.S. Appl. No. 14/266,672 mailed Aug. 27, 2014.
Non-Final Rejection for U.S. Appl. No. 14/266,672 mailed Jul. 21, 2014.
Notice of Allowance for U.S. Appl. No. 11/836,779 mailed Jan. 9, 2013.
Non-Final Rejection for U.S. Appl. No. 12/644,777 mailed Oct. 12, 2011.
Final Rejection for U.S. Appl. No. 11/836,779 mailed Jun. 28, 2012.
Non-Final Rejection for U.S. Appl. No. 11/836,779 mailed Oct. 18, 2011.
Non-Final Rejection for U.S. Appl. No. 11/836,779 mailed Feb. 10, 2011.
Non-Final Rejection for U.S. Appl. No. 14/484,398, mailed Mar. 27, 2015.
Non-Final Rejection for U.S. Appl. No. 14/546,084, mailed May 7, 2015.
Notice of Allowance for U.S. Appl. No. 14/455,737 mailed Nov. 13, 2015.
Non-Final Rejection or U.S. Appl. No. 14/455,737 mailed Jun. 16, 2015.
Non-Final Rejection for U.S. Appl. No. 14/734,488 mailed Apr. 25, 2016.
Notice of Allowance for U.S. Appl. No. 11/837,058 mailed Nov. 8, 2010.
Final Rejection for U.S. Appl. No. 11/837,058 mailed Oct. 18, 2010.
Non-Final Rejection for U.S. Appl. No. 11/837,058 mailed Jun. 24, 2010.
Notice of Allowance for U.S. Appl. No. 12/641,311 mailed Sep. 4, 2013.
Final Rejection for U.S. Appl. No. 12/641,311 mailed Aug. 17, 2012.
Non-Final Final Rejection for U.S. Appl. No. 12/641,311 mailed Feb. 2, 2012.
Notice of Allowance for U.S. Appl. No. 14/546,084 mailed Aug. 18, 2015.
Notice of Allowance for U.S. Appl. No. 14/484,398 mailed Aug. 21, 2015.
Notice of Allowance for U.S. Appl. No. 12/641,309 mailed Apr. 2, 2013.
Final Rejection for U.S. Appl. No. 12/641,309 mailed Jun. 20, 2012.
Non-Final Rejection for U.S. Appl. No. 12/641,309 mailed Jan. 12, 2012.
Notice of Allowance for U.S. Appl. No. 14/968,655 mailed Jun. 22, 2016.
Notice of Allowance for U.S. Appl. No. 14/734,488 mailed Aug. 16, 2016.
Non-Final Rejection for U.S. Appl. No. 15/190,413 mailed Sep. 9, 2016.
Notice of Allowance for U.S. Appl. No. 14/791,363 mailed Sep. 14, 2016.

400

Rule Example:

Packet 1:

Packet 2:

CONTEXT-AWARE PATTERN MATCHING ACCELERATOR

CROSS REFERENCE TO RELATED APPLICATIONS

This patent application is a continuation of U.S. patent application Ser. No. 14/791,363, filed Jul. 3, 2015, now U.S. Pat. No. 9,491,143, which is a continuation of U.S. patent application Ser. No. 14/496,355, filed Sep. 25, 2014, now U.S. Pat. No. 9,100,319, which is a continuation-in-part of U.S. patent application Ser. No. 14/143,156, filed Dec. 30, 2013, now U.S. Pat. No. 8,819,830, which is a continuation of Ser. No. 13/567,183, filed Aug. 6, 2012, now U.S. Pat. No. 8,646,083, which is a continuation of U.S. patent application Ser. No. 12/644,794, filed Dec. 22, 2009, now U.S. Pat. No. 8,239,950, which is a continuation of U.S. patent application Ser. No. 11/837,064, filed Aug. 10, 2007, now U.S. Pat. No. 8,079,084, all of which are hereby incorporated by reference in their entirety for all purposes.

This application may relate to subject matter disclosed in one or more of U.S. patent application Ser. No. 10/624,948; U.S. patent application Ser. No. 10/624,941; U.S. patent application Ser. No. 10/624,452; and U.S. patent application Ser. No. 10/624,914. Each of the aforementioned applications is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014-2016, Fortinet, Inc.

BACKGROUND

Field

Embodiments of the present invention generally relate to pattern matching of data by a context-aware accelerator. In particular, systems and methods for context based pattern identification and matching of data by a hardware acceleration device based on one or more constraints/conditions are provided.

Description of the Related Art

Pattern matching, in general, relates to a method of identifying a sequence of tokens, content/parameters of which meet constituents of one or more predefined patterns/formats. In operation, regular expressions, field based constraints, string based conditions, among other such criterions can be employed to search and match tokens as a function of a predefined pattern or set of patterns, wherein patterns typically constitute a specific syntax by which particular characters, fields, or strings are selected from a body of text/character/symbol based data. Exemplary applications of pattern matching include identification of location and length of a pattern within a token sequence in order to identify some predefined component of the matched pattern and to substitute matching pattern with some other token sequence or to take any other desired action on tokens (or data group they form part of) that match.

Large amounts of data are transmitted on a daily basis through computer networks, particularly via the Internet. It will be appreciated that the Internet is intended to provide efficient transport of data from a first location to one or more endpoints, and little consideration was given conventionally to the security of nodes on the network, giving unauthorized users a relatively easy access to networks as well as nodes on the network, via the Internet. Measures, such as Intrusion Prevention Systems (IPSs), Firewalls, Intrusion Detection Systems (IDSs), and Application Delivery Controllers (ADCs), among other access control mechanisms were then implemented to analyze network packets based on one or more rules/conditions that define the identifiers in packets that indicate whether they are desired or undesired, wherein packets that match the rules may be denied or rejected and packets that are valid and normal are transmitted to end devices. Typically, network packets are examined by parsing the packets to extract header and payload portions, and subsequently match the packets (or parsed portions thereof) with one or more rules/conditions/constraints defined by the access control devices to identify if the conditions are met, based on which the packets are accepted or rejected. Such rules/conditions/constraints can include multiple strings, character based expressions, or regular expressions, which are individually or in combination matched with the incoming and outgoing packets to detect undesired packets and handle them accordingly.

Due to the rapid increase of network bandwidth and cyber attack sophistication, a high performance context-aware pattern matching and text parsing system is desired by above mentioned access control applications. Besides the networking area, due to the massive amount of real-time generated unstructured data, data analysis also needs such a high performance context-aware pattern matching and text parsing system.

Various hardware accelerators have been developed to perform string matching and regular expression pattern matching. However, due to the multitude of the increasingly complicated rules and policies being developed by the access control devices, these existing hardware accelerators either have limitations on certain type of rule syntaxes or have limitations on compiled rule database memory footprint and performance. More importantly, with the strong context-awareness requirement by applications, integration of these context-unaware hardware accelerators has notable negative impact on the overall accuracy and system performance.

Therefore, there is a need of an accurate and precise context aware pattern matching and text parsing system and method that can minimize the performance vulnerability of the system. There is also a need for systems and methods that can identify, detect, analyze, and understand massive incoming unstructured packets at high speed and parse such packets for efficient pattern matching by a hardware acceleration device.

SUMMARY

Methods and systems are provided for improving accuracy, speed, and efficiency of context-aware pattern matching and parsing text based data by minimizing performance vulnerability of the system. According to one embodiment, a packet stream is received by a first stage of a context-aware pattern matching and parsing (CPMP) hardware accelerator of a network device. A pre-matching process is performed by the first stage, including string matching and overflow pattern matching, on packets within the packet stream to identify a candidate packet within the packet stream that matches one or more strings or over-flow patterns associated with a set of Intrusion Prevention System (IPS) or Application Delivery Controller (ADC) rules. A candidate rule from the set of IPS or ADC rules is identified by the first stage based on a correlation of results of the pre-matching process. Packet data of the candidate packet is tokened by the first stage to produce matching tokens and corresponding locations of the matching token within the candidate packet. A full-match process is performed on the candidate packet by a second stage of the CPMP hardware accelerator, including multiple CPMP processors, to determine whether the candidate packet satisfies the candidate rule by fetching and executing special purpose CPMP instructions to perform one or more of (i) context-aware pattern matching on one or more packet field values of the candidate packet, (ii) context-aware string matching on packet data of the candidate packet and (iii) regular expression matching on the packet data based on multiple predefined conditions associated with the candidate rule, corresponding contextual information provided by the candidate rule, the matching tokens and the corresponding locations. Results of the full-match process are provided by the second stage to a general purpose processor of the network device.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
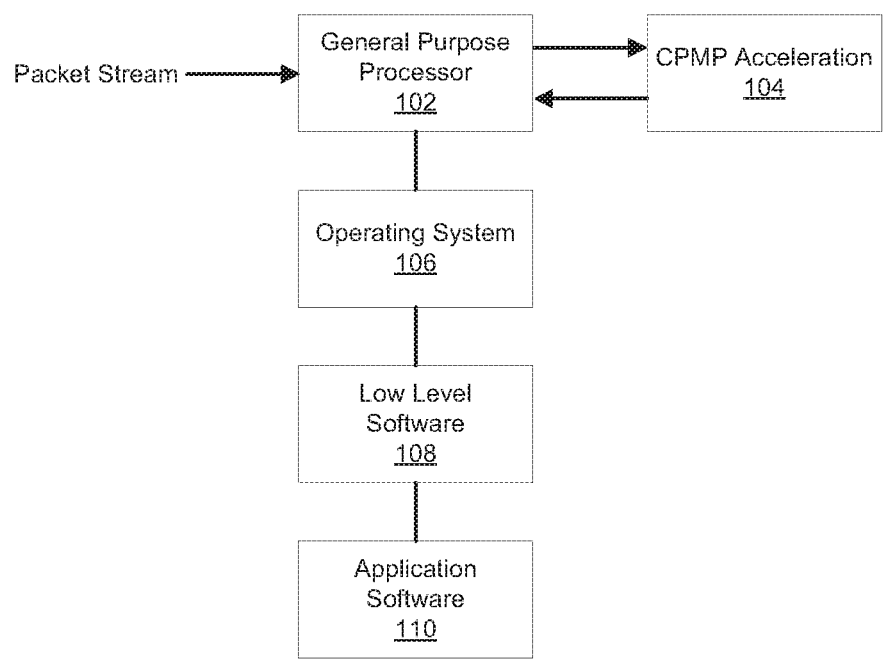
FIG. 1 illustrates an exemplary architecture for pattern matching in network packets received by a general-purpose processor in accordance with an embodiment of the present invention.

Methods and systems are described for improving accuracy, speed, and efficiency of context-aware pattern matching. Embodiments of the present invention enable identification, detection, analysis, understanding, and conversion of unstructured incoming network packets at relatively high speed by means of a hardware acceleration device comprising an acceleration processor that is aware of contextual relationships between packet tokens and which performs context-based pattern matching by means of instructions. Embodiments of present invention further implement a search methodology for input traffic packets in a semantic pattern-matching manner to identify the contextual function and extract information from the incoming traffic packets and accordingly implement network access control mechanisms.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

According to one embodiment, a context-based packet pattern matching system configures one or more processors of an acceleration device to be operatively coupled with one or more general-purpose processors. Although embodiments of the present invention are described with reference to network packet based data, it will be appreciated by those skilled in the art that the system and methods described herein can be configured for any kind of data within which pattern matching is to be performed. Network packet streams are therefore completely exemplary and all kinds of data sequences are included within the scope of the present invention. In an implementation, acceleration device and/or the general purpose processor(s) can be configured to initially receive a packet stream from one or more network interfaces. Once the packet stream has been received, the packets can be reassembled by a reassembly module and/or reordered by a reorder module. Either or both the modules can be implemented in any of the acceleration device and/or the general purpose processor(s) based on whether the reassembly and/or the reordering functions are to be performed by hardware (e.g., an acceleration device) or by the software (e.g., running on one or more general purpose processors).

According to one embodiment, reassembled/reordered packets can be received in the acceleration device for context-based pattern matching, wherein the acceleration device comprises a pre-matching module, a correlation module, and a processing module. According to one embodiment, the pre-matching module is configured to match an incoming packet stream with one or more conditions/criteria to identify packets meeting the one or more conditions. In an implementation, such conditions can include one or a combination of field-level constraints, protocol-level constraints, string-level constraints, and character-level constraints, wherein each condition can be met by multiple packets and each packet can meet multiple conditions.

According to one embodiment, the pre-matching module is configured to include a string matching module, a passive overflow pattern-matching module, an active overflow pattern matching module, and a symbol Content Address Memory module. The string matching module can be configured to implement string-level matching to assess whether a given string-based pattern is present in any packet of the incoming packet stream. The passive overflow pattern matching module, on the other hand, can be configured to take the packet stream as a first input along with taking the output from the string matching module as a second input in order to implement passive matching based on overflow patterns that occur between packet characters and/or strings within a defined range. Such a defined range, also referred to as threshold, can either be set manually or automatically.

According to one embodiment, the active overflow pattern matching module is configured to implement active matching of overflow patterns that occur between at least two packet characters within a defined range. In an implementation, the active overflow pattern matching module can also be configured to evaluate distance between the start of the packet stream and a special character, wherein if the distance is greater than a defined threshold (range), a match is reported. The symbol content address memory matching module, on the other hand, is configured to match packets having one or more regular expression based conditions. In an implementation, the symbol content address memory-matching module can also be configured to support short patterns, medium patterns, and long patterns, wherein each pattern is a series of characters and wild card masks.

According to one embodiment, the correlation module is configured to correlate at least one identified packet based on the one or more conditions to generate matching tokens of the packet that meet the one or more conditions. In an implementation, the correlation module identifies whether a set of conditions that are implemented for a network packet stream is met in a single packet, in which case, the module is configured to send, to one or more processors of the acceleration device, the matching tokens of the packet along with identifiers of the one or more conditions. Locations of the matching tokens in the corresponding packets can also be sent to the processor of the acceleration device by the correlation module and/or the pre-matching module.

According to one embodiment, the processing module is configured to receive and process the matched tokens with identifiers of the one or more conditions based on one or more of context-aware string matching, regular expression matching, and packet field value matching to extract packets that match the context of the one or more conditions. As merely satisfying the one or more conditions does not make a packet relevant for access control, the processing module, taking into consideration, context-aware special instructions and general purpose instructions, processes the matching tokens to identify whether the packets to which the tokens relate are of contextual relevance. Output from the processing module can be given to the general purpose processor to, based on the pattern matching packets, implement the access control mechanisms (e.g., Intrusion Detection System (IDS), Intrusion Prevention System (IPS), firewall or Application Delivery Controller (ADC)) and handle network traffic accordingly.

FIG. 1 illustrates an exemplary architecture 100 for pattern matching in network packets received by a general-purpose processor 102 in accordance with an embodiment of the present invention. Those skilled in the art will appreciate that the illustrated construction/configuration is completely exemplary in nature and any other construction/coupling between general-purpose processor 102 and context-aware pattern matching and parsing (CPMP) acceleration hardware 104 is within the scope of the present disclosure. Although embodiments of the present disclosure are made with respect to context-based pattern matching, those skilled in the art will appreciate that the disclosure clearly relates to any of real-time capturing, aggregating, classifying, annotating, and storing packetized data transmitted over a network or any other data stream.

According to one embodiment, general-purpose processor (GPP) 102 can include/refer to a hardware device having a fixed form and whose functionality is variable, wherein this variable functionality is defined by fetching instructions and executing those instructions (for example, an Intel Xeon processor or an AMD Opteron processor), of which a conventional central processing unit (CPU) is a common example. In an aspect, GPP 102 can itself include multiple processors, such as in a multi-core processor architecture. Any such construction is therefore completely within the scope of the present disclosure.

CPMP acceleration hardware 104, on the other hand, can also include a processor, which may collectively be referred to as CPMP processor 104, which can include a computational engine designed to operate in conjunction with other components in a computational system such as with the GPP 102. Typically, CPMP processor 104 is optimized to perform a specific set of tasks and can be used to offload tasks from the GPP 102 in order to optimize system performance. The scope of tasks performed by CPMP processor 104 may be fixed or variable, depending on the architecture of the CPMP processor 104 and/or of the CPMP acceleration hardware. CPMP acceleration hardware 104 can be configured to include software and/or firmware implemented by the CPMP processor for offloading one or more processing tasks from the GPP 102 to decrease processing latency for those tasks relative to the main processor. Depending upon the particular implementation, CPMP acceleration hardware 104 may include a programmable gate array or an Application Specific Integrated Circuit (ASIC).

In one embodiment, the CPMP processor 104 is configured to perform a specific function of pattern matching, parsing, and processing of incoming network packets to enable network protection devices, such as IPSs, IDSs, firewalls, gateways and/or ADCs to accurately and efficiently detect specific packets having defined tokens/formats indicative of malicious or non-desirable packets. CPMP processor 104 can also be configured to execute any or both of general-purpose Reduced Instruction Set Computing (RISC) instructions and special purpose CPMP instructions. Instruction sets for both the different types of instructions can be configured such that they support pattern-matching syntaxes, such as Perl Compatible Regular Expression (PCRE).

According to one embodiment, a compiler associated with CPMP acceleration hardware 104 can be implemented to take one or more conditions/rules/criterion defined by a network security device as input and generate one or more instructions to process the incoming network packets based on the one or more conditions/rules/criterion.

FIG. 1 also illustrates a hierarchy of execution of instructions, wherein GPP 102 uses operating system 106 to access application software 110 by means of low-level software 108. Low-level software 108 may act as middleware located between the application program/software 110 and the operating system 106 to map an old Application Programming Interface (API) to a new API. GPP 102 can receive packet data and can optionally segment it by coarse-grained context information before sending it to CPMP acceleration hardware/device/system 104.

According to one embodiment, CPMP acceleration hardware/device/system 104 can pre-match and tokenize the incoming network packets from the GPP 102 based on one or more defined conditions/constraints/rules, such as field-level conditions/constraints, protocol-level conditions/constraints, string-level conditions/constraints, and character-level conditions/constraints, among others. Matching tokens, packets thereof, along with the conditions/rules being matched can then be processed by the CPMP processor of device 104 to implement one or a combination of context-aware string matching, text-based protocol parsing, field value pattern matching, field value extraction, format conversion, content/context understanding, and regular expression matching, among other like functions to identify packets having matched context-based patterns and send such packets back to the GPP 102 for necessary/desired action.

In the present architecture of FIG. 1 therefore, CPMP acceleration 104 is behind the GPP 102, wherein the GPP 102 can be configured to perform one or both of Internet Protocol (IP)/Transmission Control Protocol (TCP) reassembly and reordering of IP packets. According to one embodiment, GPP 102 can include or be configured with a controller, such as TCP enabled Ethernet controller (TEEC) that may include a buffer such that when TEEC receives incoming TCP packets, it may temporarily buffer at least a portion of the incoming TCP packets in the buffer and then reassemble the TCP/IP packets data and/or IP fragments for onward transmission to the CPMP accelerator 104. Received missing packets and/or out-of-sequence packets can also be reassembled and/or reordered. GPP 102 can also be configured to perform more flexible analysis before sending incoming network packets to the CPMP acceleration hardware 104.

Figure 2:
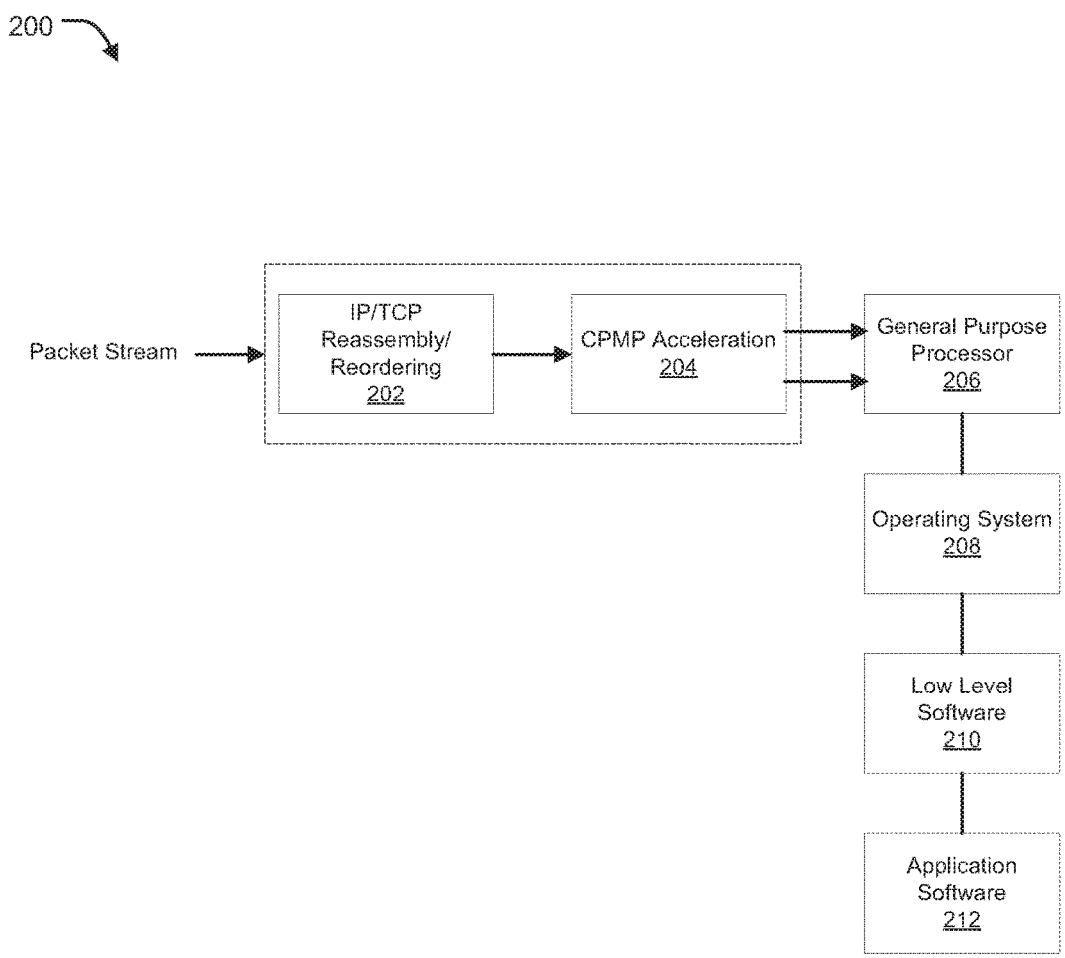
FIG. 2 illustrates an exemplary architecture for pattern matching in network packets received by a hardware acceleration device in accordance with an embodiment of the present invention.

FIG. 2 illustrates an exemplary architecture 200 for pattern matching in network packets received by a hardware device 250 in accordance with an embodiment of the present invention. As shown, hardware device 250 can be configured to include or be operatively coupled with a TCP/IP reassembly/recording module(s) 202 and a CPMP acceleration hardware device 204, and can be configured to receive the incoming network packet stream and therefore TCP/IP reassembly and/or reordering can be offloaded by GPP 206 to CPMP acceleration device 250. Furthermore, as the incoming packets are first received by the hardware 250 and processed by the CPMP acceleration device 204, GPP 206 may no longer receive the incoming packets from sessions that are marked as legitimate by the CPMP acceleration device 204. Once packets that contextually match with one or more conditions/rules/rule identifiers are identified, such packets can be forwarded to the GPP 206 for onward processing/transmission to the application software 212 through operating system 208 and low-level software 210 as already described above.

Figure 3:
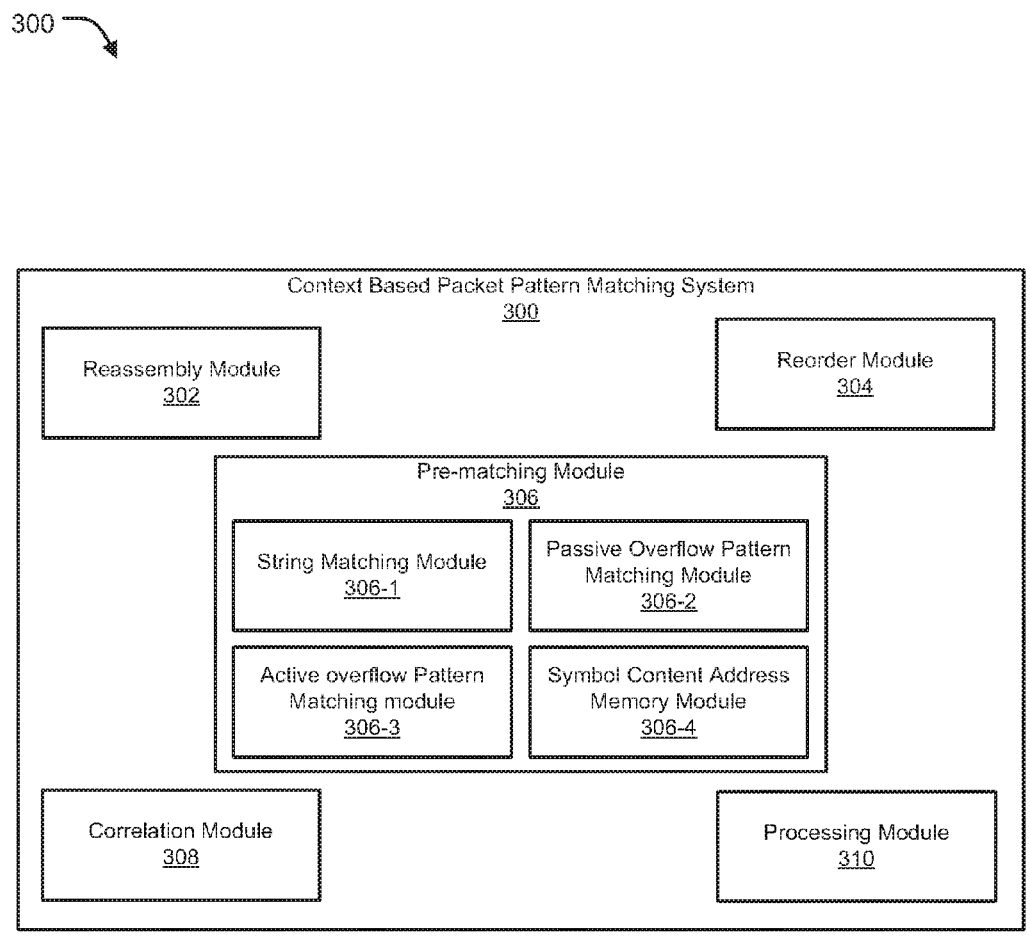
FIG. 3 illustrates exemplary functional modules of a context based packet pattern matching system a block diagram in accordance with an embodiment of the present invention.

FIG. 3 illustrates exemplary functional modules of a context-based packet pattern matching system 300 in accordance with an embodiment of the present invention. Those skilled in the art will appreciate that although the present representation of context-based packet pattern matching system 300 is discussed in terms of exemplary functional modules spanning both a general purpose processor and a CPMP hardware device, context-based packet pattern matching system 300 can be configured as different subsystems that are operatively coupled with each other, or as a single system encompassing such sub-systems, or in any other manner as desired. All such arrangements, structures, and constructions are completely within the scope of the instant disclosure.

According to one embodiment, context-based packet pattern matching system 300 can include one or more processors in an acceleration hardware device as well as one or more processors that form part of the general-purpose processor. Context-based packet pattern matching system 300 can also include a memory and/or one or more internal data storage devices operatively coupled to the one or more processors. According to one embodiment, functional modules of context-based packet pattern matching system 300 can include a reassembly module 302, a reordering module 304, a pre-matching module 306, a correlation module 308, and a processing module 310.

In one embodiment, reassembly module 302 and/or reordering module 304 can be implemented/executed by a general-purpose processor upon receipt of the incoming network packets. In another embodiment, reassembly module 302 and/or reordering module 304 can also be configured in a hardware device that is operatively coupled with or includes the CPMP acceleration hardware device such that the functions relating to reassembly and/or reordering of incoming network packets can be offloaded to the CPMP processor of the CPMP acceleration hardware device. Therefore, the reassembly module 302 and/or the reordering module 304 can be performed by either by a general purpose processor or by a CPMP processor or by both, as shown in FIGS. 1 and 2 above.

According to one embodiment, network packets can include data packetized according to a variety of different protocols (such as HyperText Transfer Protocol (HTTP), File Transfer Protocol (FTP), IP version 4 (IPv4), IP version 6 (IPv6), TCP, User Datagram Protocol (UDP), Server Message Block (SMB), Simple Mail Transfer Protocol (SMTP), and so on) that may be transmitted over the network. The general purpose processor and/or the acceleration hardware can be configured to capture, aggregate, annotate, store, and index network packet data in real time from one or more portions of the network and retrieve such data utilizing the storage and the indexing database. Thus, the storage may be operable as a packet capture repository and the indexing database may be operable as an index into the packet capture repository. The storage may include any kind of storage media, including, but not limited to one or more magnetic storage media, optical storage media, volatile memory, non-volatile memory, flash memory, and the like, configured as a Redundant Array of Independent Discs (RAID) implementation, a storage area network, and so on.

According to one embodiment, reassembly module 302 can be configured to arrange packets sent by a source port in their sending sequences at the source port before sending onward to an output port. Reassembly module 302 can therefore reassemble cells of a packet into a complete packet and arrange the packets in their sending sequences for onward transmission. Reordering module 304, on the other hand, can be configured to gather out-of-order packets, from various paths of network routers, for example, and reorder the packets in correct sequence so that accurate pattern matching can take place at the pre-matching module 306. Reordering module 304 can therefore receive a data packet and determine if the data packet is received out of order. If found out of order, reordering module 304 can use one or more known mechanisms, such as incorporating delay, using alternate transmission paths/channels, creating temporary routing loops, among other such mechanisms, to gather packets and then arrange them in a defined sequence.

Pre-matching module 306 can be configured to receive re-assembled and re-ordered incoming network packets as a stream, and match the incoming packet stream with one or more conditions to identify packets meeting the one or more conditions. According to one embodiment, such one or more conditions can include packet field-level conditions/criterions/rules, protocol-level conditions/criterions/rules, string-level conditions/criterions/rules, and character-level conditions/criterions/rules, among others that are configured to process each incoming packet to determine if the packet has one or more tokens that match the defined conditions/criterions/rules. Pre-matching module 306 can further be configured to determine the locations of matching tokens and send the locations to one or more acceleration device processors for processing the matched tokens. An exemplary architecture of pre-matching module 306 is described below with reference to FIG. 6.

According to one embodiment, pre-matching module 306 can include a string matching module 306-1, a passive overflow pattern matching module 306-2, an active overflow pattern matching module 306-3, and a symbol content address memory module 306-4. String matching module 306-1 can be configured to implement a string-level matching to determine whether a defined string (e.g., "abc") is present in any of the incoming packets of the packet stream.

In an exemplary implementation, string matching may be a kind of dictionary-matching algorithm, e.g., Aho-Coasick string matching, that locates elements of a finite set of strings (the "dictionary") within an input text. The string matching may match all patterns simultaneously. The complexity of such an algorithm is linear in the length of the patterns plus the length of the searched text plus the number of output matches. String matching module 306-1 or any other module/sub-module of pre-matching module 306 can be configured to undertake a pattern matching process that can determine one or more characteristics of the packets in slots of memory, including, but not limited to, identifying an application to which the packets relate, the protocol utilized to transmit the packets, file types of payload data content, source and/or destination addresses associated with the packets and packet lengths. The pattern matching process may determine characteristics by comparing bit patterns of packets with a library of bit patterns associated with the characteristics. An exemplary architecture of string-matching module 306-1 is described below with reference to FIG. 7.

According to another exemplary embodiment, pre-matching module 306 can be configured to perform pattern matching analysis, which may determine one or more characteristics of the packets in the slots of the memory, such as identifying application to which the packets relate, protocol utilized to transmit the packets, file types of payload data content, source and/or destination addresses associated with the packets, packet lengths, and so on. The pattern matching process may determine the characteristics by comparing bit patterns of the packets with a library of bit patterns associated with the characteristics. According to another embodiment, pre-matching module 306 may be one or more types of processing units capable of performing pattern matching analysis on multiple packets in parallel. For example, the pattern matching processing unit may be a graphical processing unit that includes thousands of separate cores which may each perform pattern matching analysis on a different packet. As such, the pattern matching processing unit may simultaneously (or substantially simultaneously) perform pattern matching analysis on the packets of one or more slots in the memory.

According to one embodiment, passive overflow pattern matching module 306-2 can be configured to implement passive matching based on overflow patterns that occur between packet characters and/or strings within a defined range. In an implementation, string-matching results from module 306-1 can be fed into passive overflow pattern matching module 306-2 as triggers for overflow patterns with simple strings as prefixes. Passive overflow pattern matching module 306-2 can therefore take both the packet stream as well as the string matching results from string matching module 306-1 as input and compare the distance between a simple string prefix and a character of interest following the prefix such that if the distance is greater than a certain threshold, a match is reported to correlation module 308. An exemplary architecture of passive overflow pattern matching module 306-2 is described below with reference to FIG. 8.

According to one embodiment, active overflow pattern matching module 306-3 can be configured to implement active matching of overflow patterns that occur between at least two packet characters within a defined range. Active overflow pattern matching module 306-3 therefore may handle overflow patterns that start and end with single characters by measuring a distance between two special characters or a distance between the start of the incoming packet stream and a special character such that if the distance is greater than a certain threshold, a match is reported to the correlation module 308. An exemplary architecture of active overflow pattern matching module 306-3 is described below with reference to FIG. 9.

According to one embodiment, symbol content address memory matching module 306-4 can be configured to match packets based on one or more regular expression based conditions. Symbol content address memory matching module 306-4 therefore may handle special regular expressions with no strings such that packets meeting the conditions specified by the special regular expressions can be matched and extracted. According to one embodiment, symbol content address memory matching module 306-4 can be configured to support short patterns, medium patterns, and long patterns, wherein each pattern can include a series of characters and/or wild card masks, which when matched are reported back to the correction module 308. An exemplary architecture of symbol content address memory module 306-4 is described below with reference to FIG. 10.

According to one embodiment, correlation module 308 can be configured to correlate at least one identified packet based on the one or more conditions to generate matching tokens of the packet that meet the one or more conditions. According to one embodiment, correlation module 308 can be configured to identify rule IDs corresponding to the matching one or more conditions and process the identified rule IDs with the matched packets to extract tokens from the matched packets that fulfill the conditions specified by the identified rule IDs, and send the extracted tokens to the CPMP processor for handling by processing module 310. In another exemplary implementation, pre-matching module 306 can also be configured to send matching token locations to the CPMP processor. According to another embodiment, correlation module 308 can further be configured to generate/extract IPS/application control candidate rule IDs, by means of a first part of the CPMP hardware acceleration device, for example, and compute correlation between the pre-matched results obtained/received/retrieved from the pre-matching module 306. According to one embodiment, pre-matching module 306 can further be configured to tokenize text-based packet data by means of a first part of the CPMP acceleration device, for example. Correlation module 308 can further be configured to emit candidate rule IDs and the aforementioned tokens along with the packet data to the processing module 310 implemented by, a second part of the CPMP acceleration device through the CPMP processor, for example.

According to one embodiment, processing module 310 can be configured to receive and process matched tokens with rule/condition identifiers (IDs) of the one or more conditions based on one or a combination of context-aware string matching, regular expression matching, and packet field value matching to extract packets that match the context of the one or more conditions. In an implementation, CPMP processor implementing processing module 310 can be configured to perform context-aware pattern matching by looking at received tokens and their locations such that the processor knows whether a context might exist or not, and where a context starts if it does exist. In an exemplary implementation, context buffers can be used to hold the packet data and one or more special purpose registers can be configured between the pattern matching data path and the RISC data path, which registers can serve multiple purposes including linking the two data paths. A token buffer can be configured to store/hold tokens and their corresponding locations generated by pre-matching module 306, wherein these tokens and their locations indicate the start of a "context".

Processing module 310 can further be configured to process the matched tokens based on one or a combination of text-based protocol parsing, field value extraction, format conversion, and context-aware content understanding. According to one embodiment, CPMP processor can include one or more processors that form part of or are operatively coupled with the acceleration hardware device to fetch context and pattern matching instructions for conducting processing from an off-chip storage device.

According to one embodiment, context and pattern matching instructions can include instructions for sequentially performing and/or performing in parallel one or a combination of exact character matching, negative character matching, wild card matching, string matching, field matching, and range matching. One or more processors of the acceleration device can be configured to fetch context and pattern matching instructions for conducting the step of processing from one or more instruction caches.

Figure 4:
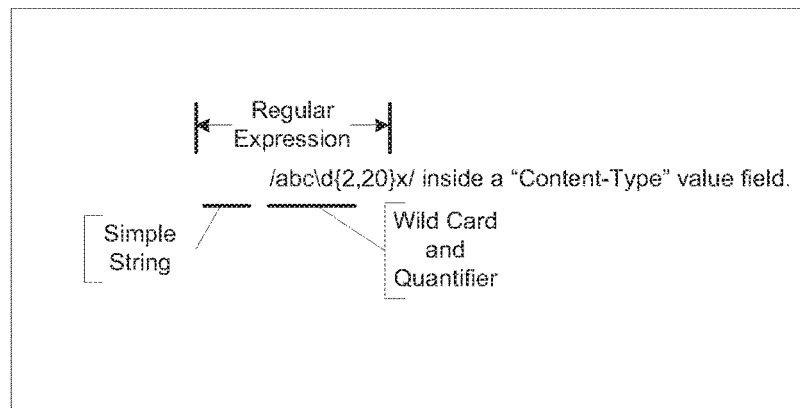
FIG. 4 illustrates an exemplary rule having multiple constraints for matching with incoming network packets in accordance with an embodiment of the present invention.
Figure 4:
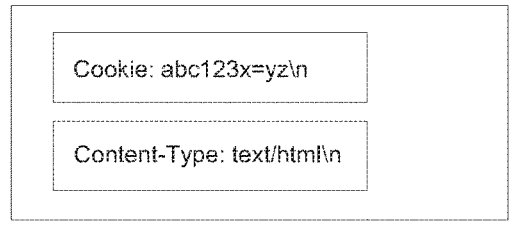
Figure 4:
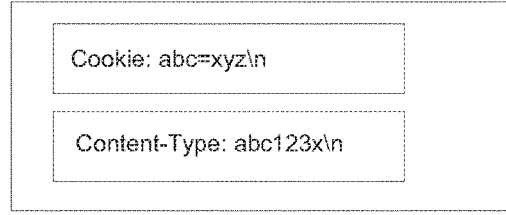

FIG. 4 illustrates an exemplary rule 400 having multiple constraints for matching with incoming network packets in accordance with an embodiment of the present invention. Such a rule, in an exemplary embodiment, can be configured/defined by a network security device. Those skilled in the art will appreciate that rule 400 is exemplary in nature and any other rule can be configured as desired by the system for efficient and accurate context based pattern matching In an embodiment, rule 400 is defined such that it looks for a regular expression within the context of Content-Type field value in an HTTP regular message. In a request message, a "Content-Type" context starts with a token string "Content-Type:" and ends with a "\n" (new line) delimiter, as shown in Packet 1 and Packet 2 strings. Inside the regular expression of rule 400, there can be a simple string (e.g., "abc") and a wild card "\d" that is modified by a quantifier such as {2, 20}.

Figure 5:
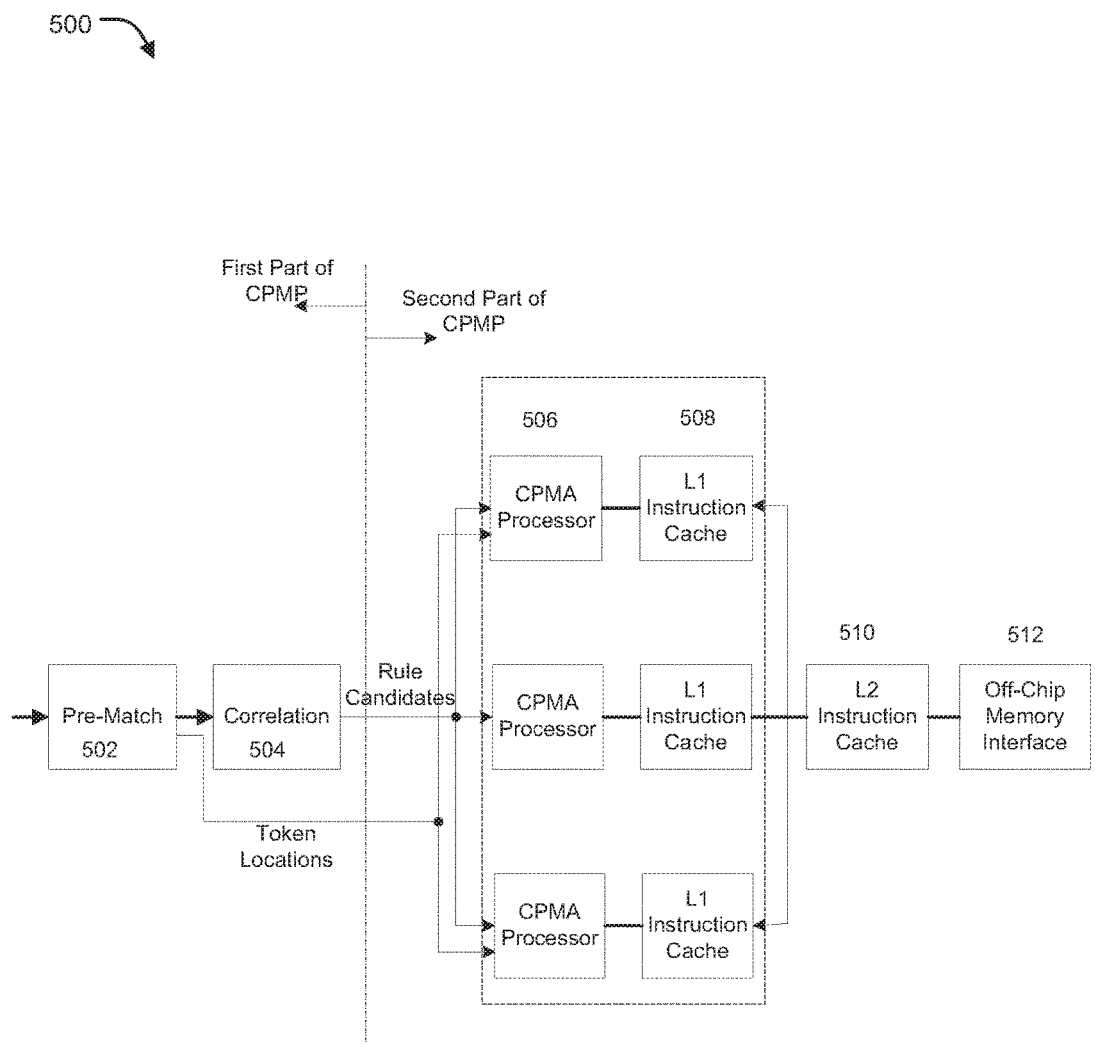
FIG. 5 illustrates an exemplary functional block diagram of a hardware acceleration device in accordance with an embodiment of the present invention.

FIG. 5 illustrates an exemplary functional block diagram of a hardware acceleration device 500 in accordance with an embodiment of the present invention. Taking rule 400 as an example, pre-match process 502 can be configured to look for two conditions, with the first condition relating to whether the string "Content-Type:" is present within a packet, and the second condition relating to whether the simple string "abc" is present within the packet. The condition matching information can then be fed from pre-match process 502 to a correlation process 504, wherein correlation process 504 can determine whether both conditions have been met by the same packet. If so, correlation process 504 (implemented by correlation module 308) can send the ID of the exemplary rule as a candidate to CPMP processor 506. The pre-match process 502 can also send the tokens' locations to CPMP processor 506. Thus, when CPMP processor 506 performs context-aware pattern matching, CPMP processor 506, by looking at the tokens and their locations, knows whether a "context" might exist or not, and where a specific "context" starts if it does exist. For both Packet 1 and Packet 2 of FIG. 4, correlation process 504 can report the example rule 400 as a candidate to CPMP processor 506, because both packets satisfy the two conditions. CPMP processor 506 can perform an exact match, which can be controlled by instructions stored in an off-chip storage/ memory interface 512. Two levels of cache memory, 508 and 510, may provide on-chip instruction caching.

Figure 6:
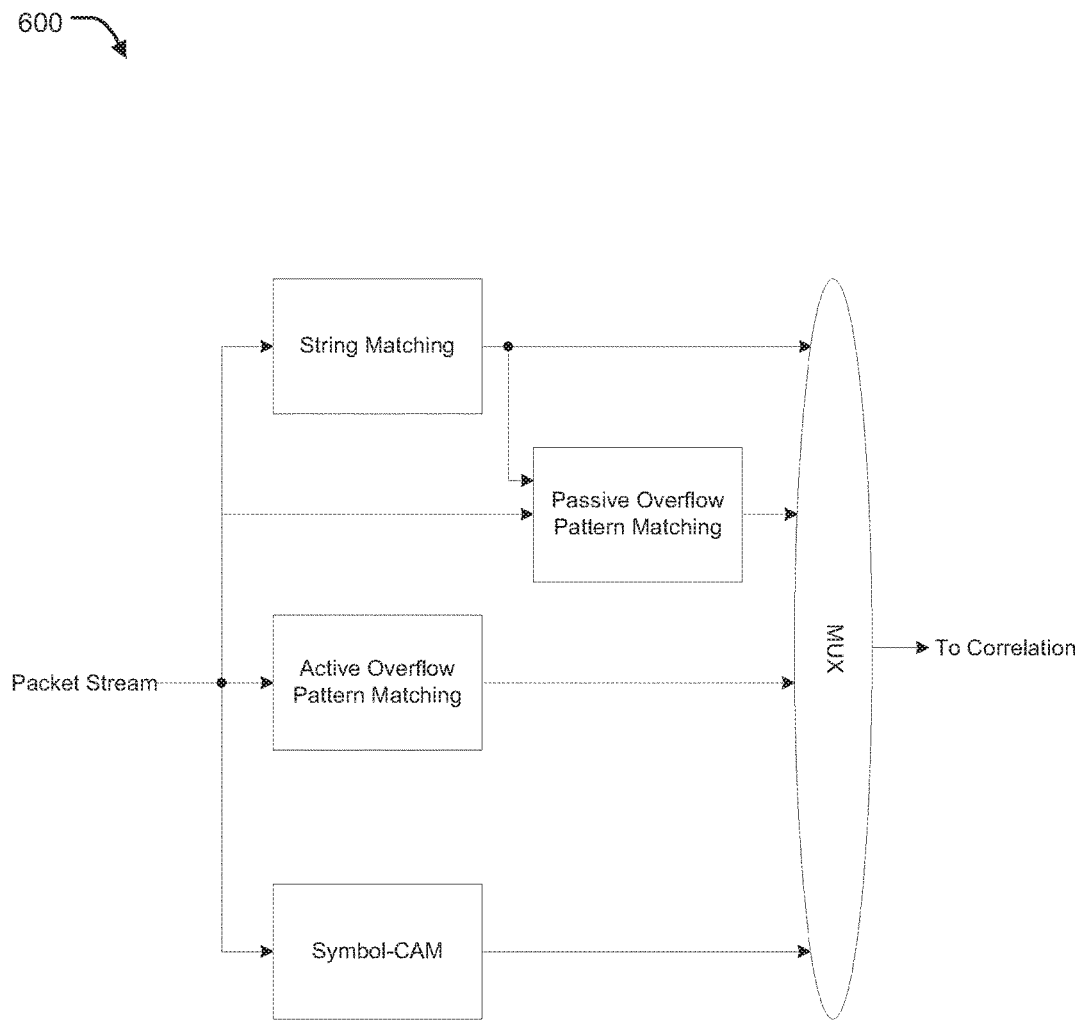
FIG. 6 illustrates an exemplary architecture of a pre-matching module in accordance with an embodiment of the present invention.

FIG. 6 illustrates an exemplary architecture 600 of a pre-matching module in accordance with an embodiment of the present invention. As mentioned above, pre-matching module 306 of FIG. 3 can include one or a combination of string matching, passive overflow pattern matching, active overflow pattern matching, and symbol content address memory based matching. In an instance, with reference to FIG. 6, string matching 602 performs simple string matching, wherein its matching results can be fed into passive overflow pattern matching 604 as triggers for overflow patterns with simple strings as prefixes. The active overflow pattern matching 606 can handle overflow patterns that start and end with single characters, whereas symbol-CAM 608 handles special regular expressions with no strings being extracted. Results from all these modules can be sent to the correlation module.

Figure 7:
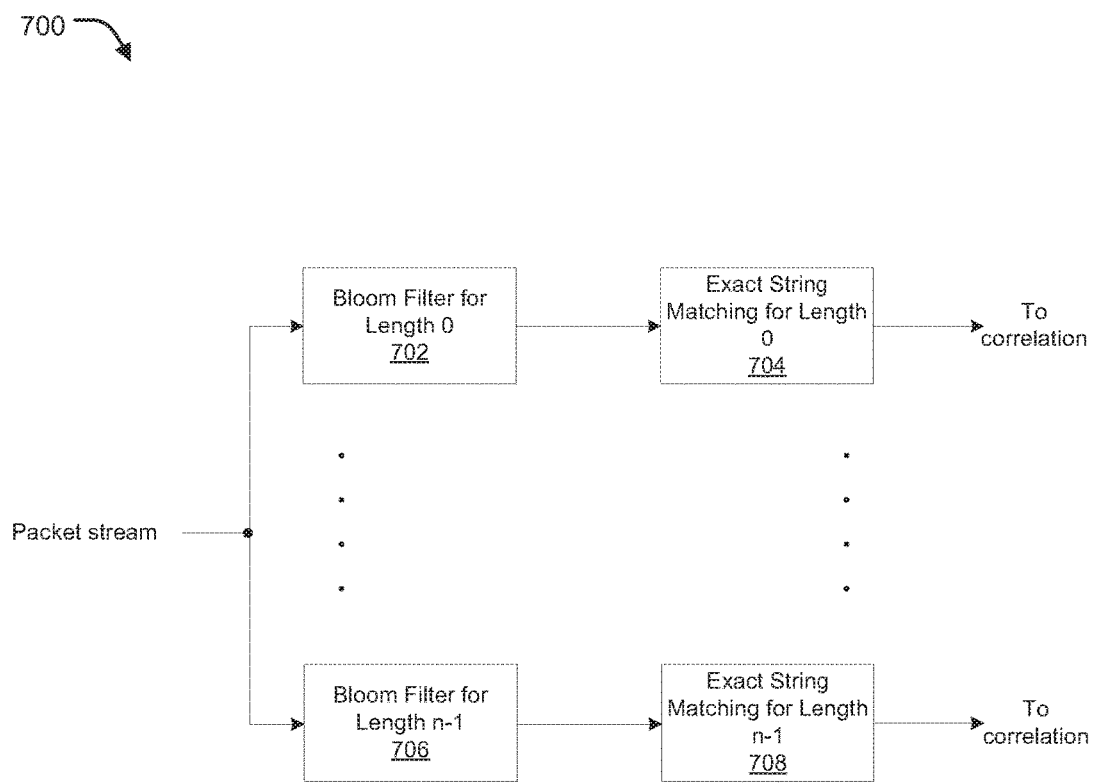
FIG. 7 illustrates an exemplary implementation of a string-matching module in accordance with an embodiment of the present invention.

FIG. 7 illustrates an exemplary implementation of a string-matching module 700 in accordance with an embodiment of the present invention. In the context of the present example, string-matching module 700 can be configured to support different lengths of strings, each of which can have a bloom filter such as 702 and 706, and an exact string matching such as 704 and 708.

Figure 8:
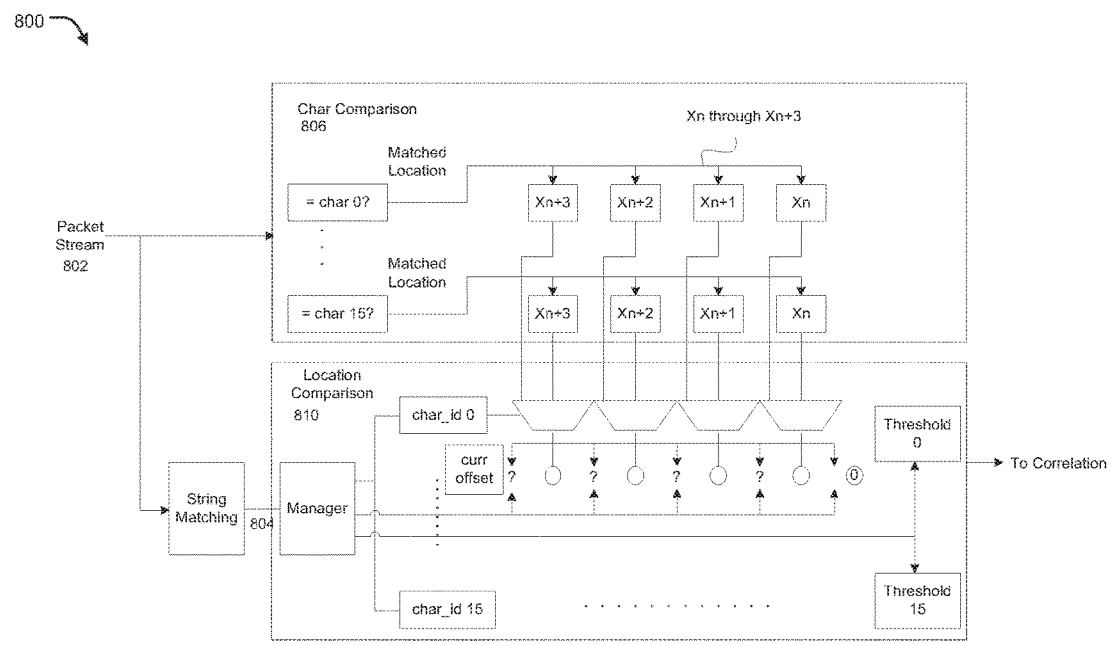
FIG. 8 illustrates an exemplary implementation of a passive overflow pattern matching module in accordance with an embodiment of the present invention.

FIG. 8 illustrates an exemplary implementation of a passive overflow pattern-matching module 800 in accordance with an embodiment of the present invention. In the context of the present example, passive overflow pattern-matching module 800 can take both a packet stream 802 as well as string matching results 804 as inputs and can compare a distance between a simple string prefix and a character of interest following the prefix such that if the distance is greater than a certain threshold, a match is reported to the correlation module. As shown with respect to FIG. 8, block 806 is configured to perform a character-level comparison to compute a distance between a string prefix and a character of interest, whereas block 808 is configured to compare the computed distance with a defined threshold (shown at 810) and output a result reflective of both the character comparison as well as the threshold location comparison to the correlation module.

Figure 9:
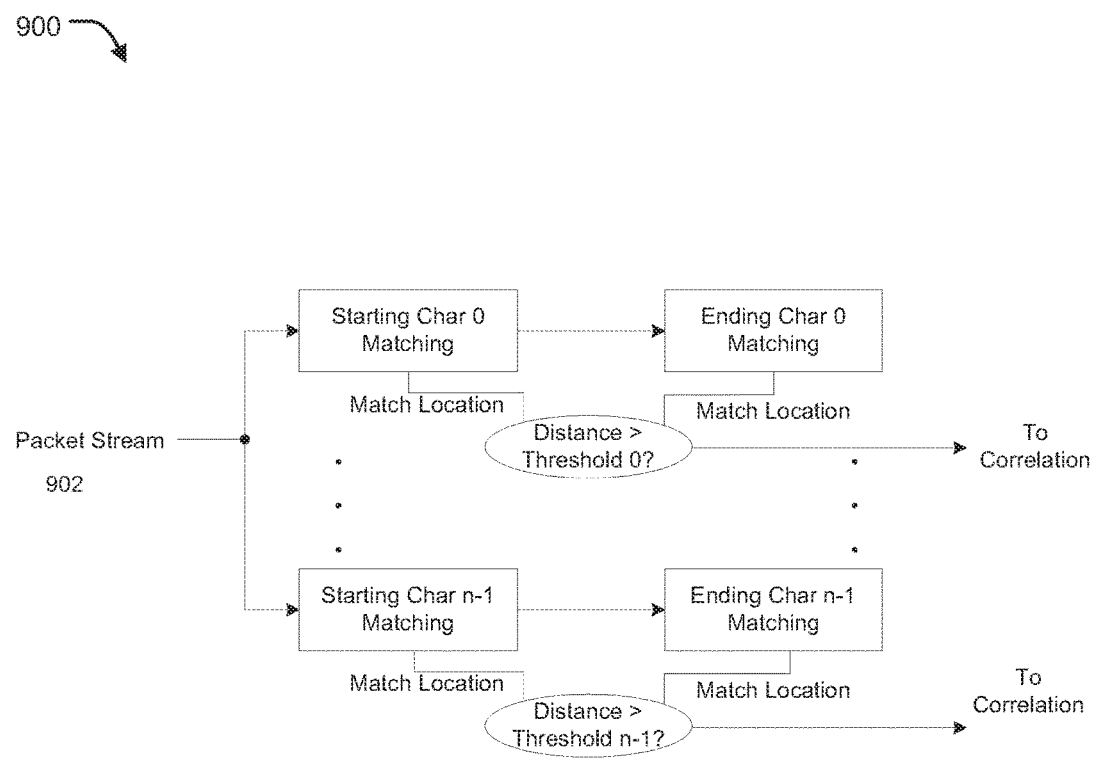
FIG. 9 illustrates an exemplary implementation of an active overflow pattern matching module in accordance with an embodiment of the present invention.

FIG. 9 illustrates an exemplary implementation of an active overflow pattern matching module 900 in accordance with an embodiment of the present invention. In the context of the present example, active overflow pattern-matching module 900 can be configured to measure distance between two special characters, or distance between start of stream and a special character, wherein, if the distance is greater than certain threshold, a match is reported to the correlation module. As illustrated by FIG. 9, packet stream 902 can be received by active overflow pattern matching module 900, wherein, for each defined/desired starting character (0 to n−1) and each corresponding ending character (0 to n−1), locations are evaluated and distance is calculated/compared with a defined respective threshold for each set of starting/ ending characters. When the computed distance is greater than the corresponding thresholds, a match is reported to the correlation module.

Figure 10:
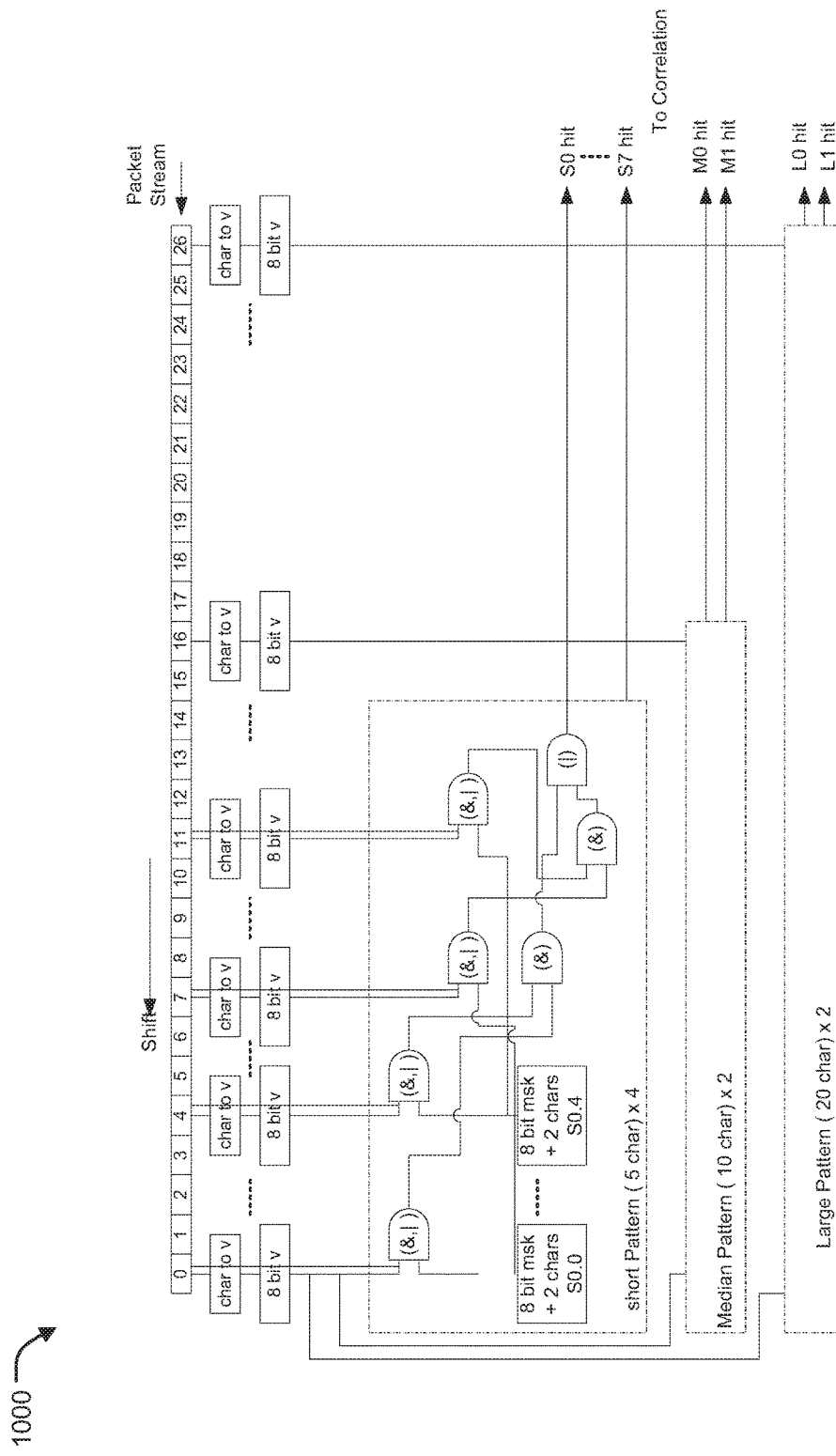
FIG. 10 illustrates an exemplary implementation of a Symbol Content Address Memory matching module in accordance with an embodiment of the present invention.

FIG. 10 illustrates an exemplary implementation of a Symbol Content Address Memory (CAM) matching module 1000 in accordance with an embodiment of the present invention. In the context of the present example, symbol content address memory matching module 1000 can be configured to support short patterns, medium patterns, and long patterns, wherein each pattern can include a series of characters and wild card masks, which when matched with the incoming packets, can be reported back to the correlation module. As shown, short patterns can include 1 to 5 characters, medium patterns can include 6 to 10 characters, and large patterns can include 11 to 20 characters, which can be processed (by, say, a logical AND operation) with the incoming packet stream and matched packets can be output to the correlation module.

Figure 11:
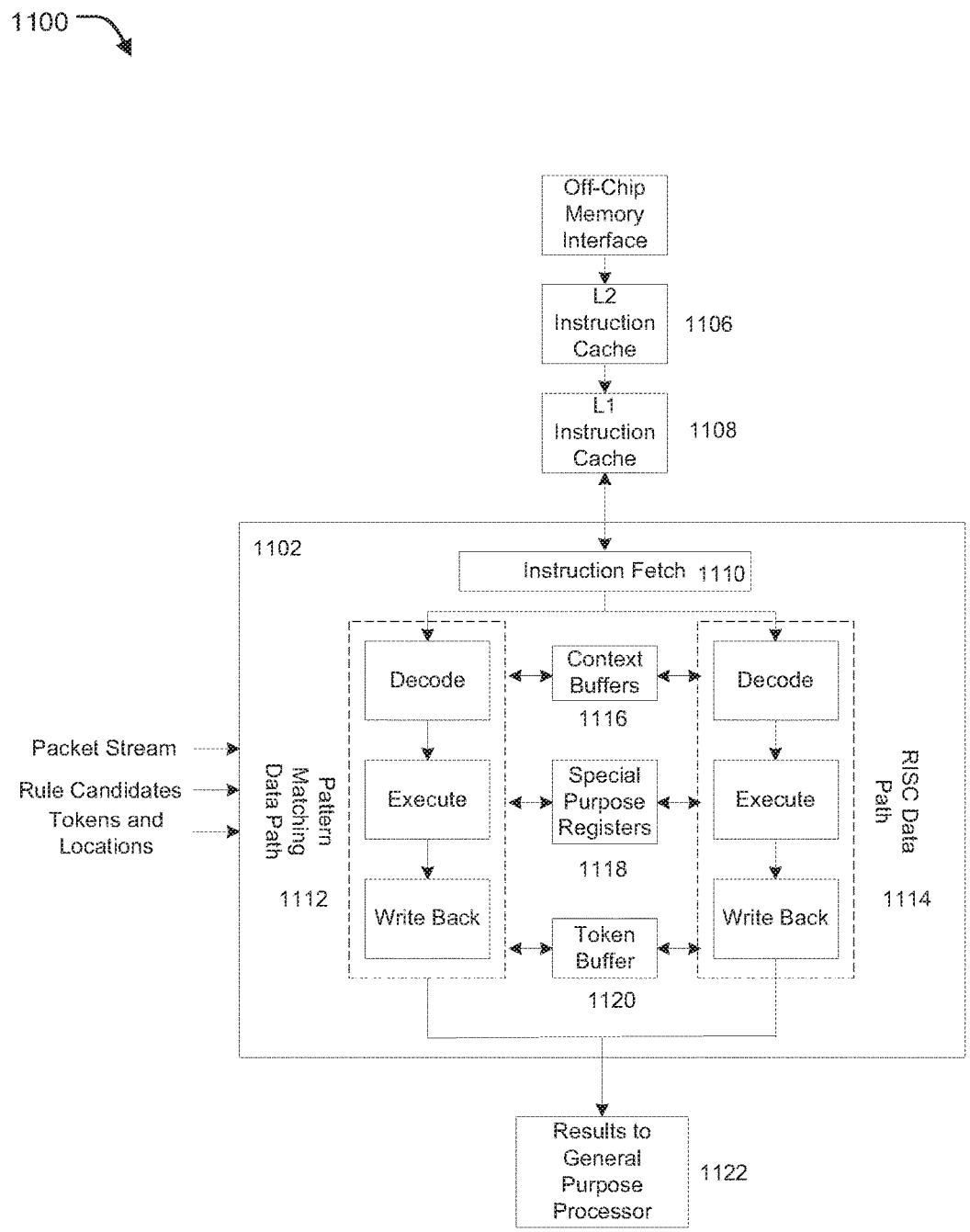
FIG. 11 illustrates an exemplary block diagram of the processor of the hardware acceleration device in accordance with an embodiment of the present invention.

FIG. 11 illustrates an exemplary block diagram 1100 of CPMP processor 1102 of the hardware acceleration device in accordance with an embodiment of the present invention. According to one embodiment, CPMP processor 1102 can form a second part of the CPMP acceleration device 104 of FIG. 1, wherein the first part can include the pre-match and the correlation module. According to one embodiment, instructions of CPMP processor 1102 can be stored in off-chip storage 1104 and cached by two levels of instruction caches, such as L1 cache 1108 and L2 cache 1106. In an exemplary embodiment, L1 cache 1108 can be dedicated to one CPMP processor, while L2 cache 1106 can be shared by multiple CPMP processors.

According to one embodiment, CPMP processor 1102 can include an instruction fetch module 1110, coupled to which there can be two data paths, namely, a pattern matching data path 1112 and a RISC data path 1114. Pattern matching data path 1112 can be configured to execute pattern matching related CPMP special instructions listed in Table 1 (below), while RISC data path 1114 can be configured to execute general purpose instructions listed in Table 2. These instructions are explained in further detail separately below. According to one embodiment, context buffers 1116 can be used to hold the packet data, wherein one or more special purpose registers 1118 can be configured between pattern matching data path 1112 and RISC data path 1114. These registers serve multiple purposes and are the link between the two data paths. Some of them are the control registers for the two data paths, whereas a few of them define ending points of contextual pattern matches. Token buffer 1120 can be configured as the storage to hold tokens and their corresponding locations generated by the pre-match module. These tokens and locations can be configured to indicate a start of a "context". In addition to pattern matching, CPMP processor 1102 can also be configured to calculate checksum, perform data type conversion, etc. by means of RISC data path 1114 that executes general purpose processor instructions.

In another embodiment, CPMP processor 1102 can also be configured to act as a controller for pattern matching data path. When a "context" is defined by fixed or variable length rather than tokens and delimiters, RISC data path 1114 can be configured to extract and/or calculate a "context" searching boundary and program it into some special purpose registers such as 1118 before the actual pattern matching is started. All the computing results can be compiled by the RISC data path 1114 into a message and sent to the general purpose processor 1122.

the compared character can be consumed or kept, either being a matched one or an unmatched one. This instruction family is a powerful group of basic building blocks to construct high performance and low memory footprint size Deterministic Finite Automaton (DFA) graphs.

The third instruction family (No. 3) searches for the first character that satisfies a wide range of criteria. When the searching is done, a test result flag is set or cleared. This

TABLE 1

| No. | Instruction families | Description |
|---|---|---|
| 1 | Simple string matching instructions | Search for a simple string with any length. Varieties include the combinations of the following:<br>1. case sensitive or case insensitive.<br>2. start from the current data buffer pointer, or an offset, or the begin of the data buffer.<br>3. search within certain range or until the end of the data buffer.<br>4. when the match is found, the (matched begin location + 1) pointer value is optionally stored into a special purpose register. |
| 2 | One character matching instructions | Perform character matching for the next data buffer byte. Varieties include the combinations of the following:<br>1. case sensitive or case insensitive.<br>2. the data buffer byte is compared against a range of characters, or a wild card mask, or multiple operand characters, or a combination of them. If the data buffer byte matches any one of them, jump to the corresponding pointer. If no match is found, jump to the default pointer.<br>3. The matched transition and the default transition can consume or keep the data buffer byte. |
| 3 | Search for character instructions | Starting from the current data pointer location, search for the first char that satisfies the searching criteria. When done, a test result flag is set or cleared, and the processor continues to the next instruction. Varieties include the combinations of the following:<br>1. case sensitive or case insensitive.<br>2. the searching criteria include a wild card mask, or a character range, or multiple characters, or a combination of them.<br>3. the searching criteria can be optionally negated.<br>4. The matched transition can consume or keep the data buffer byte.<br>5. when the match is found, the (matched begin location + 1) pointer value is optionally stored into a special purpose register. |
| 4 | Checksum instructions | Starting from the current data pointer location, calculate the checksum of the next certain number of bytes, compare the checksum with the op rand checksum value, and set/clear the test result flag. |
| 5 | Data pointer manipulation instructions | Move or set the data pointer. Varieties include the combinations of the following:<br>1. move the data pointer certain number of bytes, forwards or backwards.<br>2. set the data pointer to a value that is stored in a special purpose register, or a general purpose register. |
| 6 | Context switch instruction | Prior to the execution of this instruction, a special purpose register has a token and its location in the data buffer. This instruction compares the operand token against the token in the special purpose register, if matched, take the branch defined in the operand, otherwise, continue on the next instruction. |

According to another embodiment, Table 1 illustrates an exemplary list of CPMP special instruction families. The first instruction family (No. 1) handles simple string matching.

The second instruction family (No. 2) supports single character matching. This single character could be a character, a character class, a range, or a combination thereof. The matching result can be used to determine to where execution needs to branch. According to one embodiment, family of instructions can support many PCRE syntaxes and can also be used in many cases where ending of a "context" is defined by a single-byte character or character class.

The checksum instruction family (No. 4) calculates a checksum for a certain portion of a packet.

The data pointer manipulation instruction family (No. 5) can move a data pointer backwards or forwards, or to certain points that are previously determined by other searching instructions. This instruction family, together with other instruction families' optional storing pointer value function, can be used to represent Nondeterministic Finite Automaton (NFA) graphs.

The context switch instruction (No. 6) compares an operand token against tokens and their locations generated from the packet. If matched, the execution takes the branch, and data pointer is updated to matched token's location. This way, the processor can start a high-performance context-aware pattern matching and parsing without looking for the desired token first.

TABLE 2

| No. | Instruction groups | Description |
|---|---|---|
| 1 | ALU instructions | Perform arithmetic and logic operations. |
| 2 | General branch instructions | Branch by testing the ALU result. |
| 3 | Matching branch instructions | Branch by testing the matching result. |
| 4 | Immediate jump | Jump to immediate address, or an address in a register, and optionally store the original instruction pointer to a general purpose register. |
| 5 | Data memory read instructions | Load data indexed by register from data memory to general purpose register. Varieties include load size, Endianness and signed/zero extension. |
| 6 | Data memory write instructions | write a generate purpose register's content to data memory. |
| 7 | Special purpose register access instructions | Move data from/to a special purpose register to/from a general purpose register. |
| 8 | NOP | Non operations. |

Table 2, above, illustrates an exemplary list of general-purpose RISC instructions.

TABLE 3

| No. | Pattern interrupts | Description |
|---|---|---|
| 1 | Special char detected interrupt | When any data buffer matching instructions are being executed, this logic looks for pre-defined special character(s). When found, the ongoing searching is interrupted and a pre-defined branch is taken. The pre-defined delimiters include characters, or wild card mask, or a combination of them. |
| 2 | Search boundary reached interrupt | When any data buffer matching instructions are being executed, this logic monitors whether the data buffer pointer exceeds a pre-defined boundary. If yes, the ongoing searching is interrupted and a pre-defined branch is taken. |

Table 3 illustrates two exemplary CPMP searching interrupts. These two searching interrupts can stop an ongoing pattern matching and branch to a pre-determined instruction. The first interrupt (No. 1) stops an ongoing searching when a special character or character class is seen. This special logic can be used to handle context-aware searching when the context is defined by delimiters. The second interrupt stops an ongoing searching when the data buffer pointer reaches certain point. This special logic can be used to handle context-aware searching when the context is defined by length. The second interrupt logic can also be used to detect buffer overflow patterns commonly seen in IPS/IDS rules.

According to one embodiment, with reference to rule 400 of FIG. 4, the tokens ("Cookie:" and "Content-Type:") and their locations can be sent to and stored in the CPMP processor, wherein, when the rule, as a candidate, first starts being executed by the processor, the context switch instruction (No. 6 in Table 1) leads data pointer to where the string "Content-Type" is, and also jumps to branch taking care of the regular expression. The CPMP processor does not look at the value field of "Cookie" in the packet, and therefore, Packet 1 of FIG. 4, is not going to match, even its Cookie value does satisfy the regular expression. The CPMP processor does have to perform pattern matching for the regular expression on the "Content-Type:" field value in both two Packets 1 and 2. The No. 1 interrupt in Table 3 can be used, since this "Content-Type:" context is terminated by the new line character "\n". Some matching instructions in Table 1 can be used to construct the pattern matching for the regular expression. Some general-purpose instructions in Table 2 can be used to configure the pattern matching data path, to "glue" the matching instructions together, to do some calculation, and to compile the report message to the general-purpose processor such as 1122 of FIG. 11.

Figure 12:
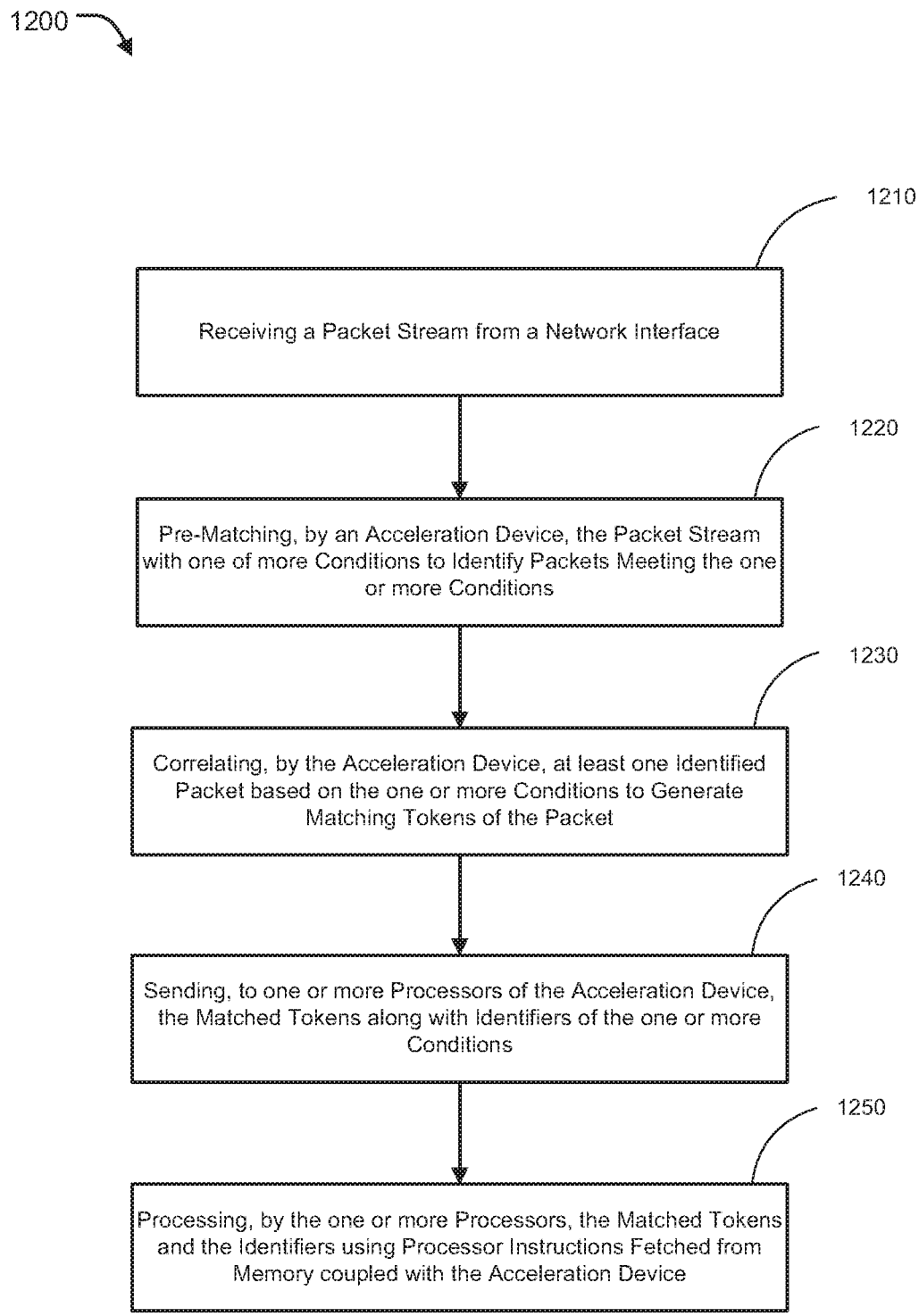
FIG. 12 is a flow diagram illustrating context-based pattern matching of network packets in accordance with an embodiment of the present invention.

FIG. 12 is a flow diagram 1200 illustrating context-based pattern matching processing of network packets in accordance with an embodiment of the present invention. At step 1210, hardware acceleration device can be configured to receive a packet stream from a network interface. Such packets can either be reordered or reassembled or both by either a general purpose processor and/or by the CPMP processor. At step 1220, hardware acceleration device can be configured to pre-match the packet stream based on one or more conditions to identify packets meeting the one or more conditions. At step 1230, hardware acceleration device can correlate at least one identified packet based on the one or more conditions to generated matching tokens of the packets, which, at step 1240, can be sent along with the condition/rule identifiers of the one or more conditions to the CPMP processor. According to one embodiment, the matched tokens and the identifiers can be processed using processor instructions fetched from memory coupled with the acceleration devices to identify packets that match the context-based patterns, wherein such packets can then be sent to the general purpose processor(s) for further transmission/processing.

Figure 13:
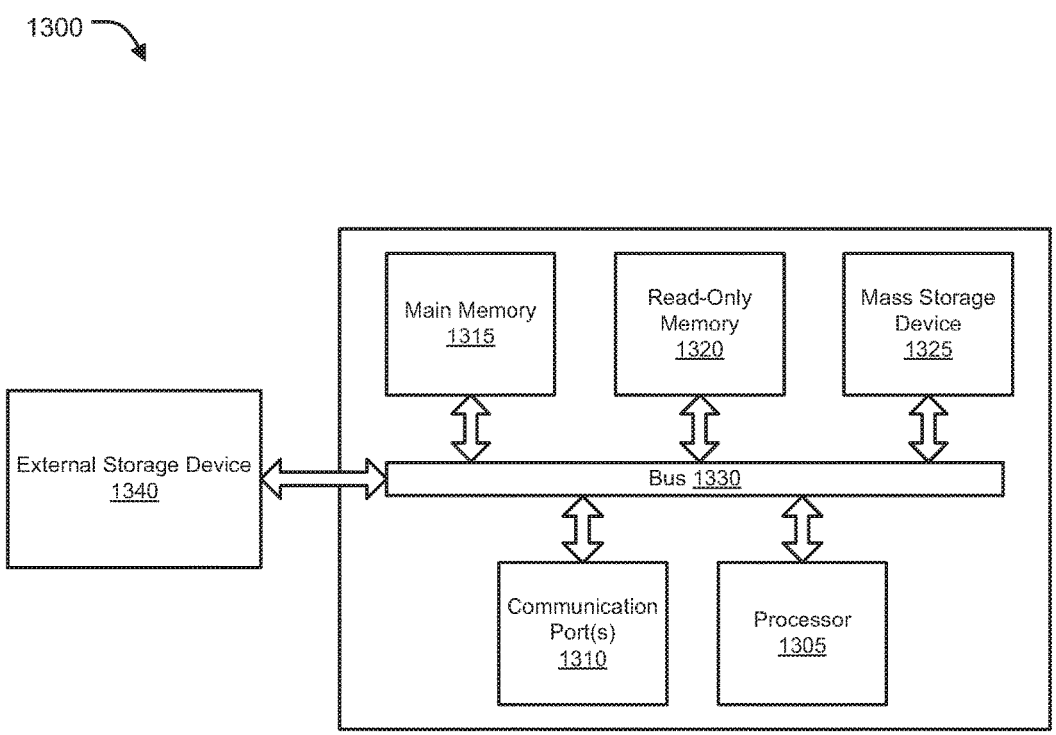
FIG. 13 is an exemplary computer system in which or with which embodiments of the present invention may be utilized.

FIG. 13 is an example of a computer system 1300 with which embodiments of the present disclosure may be utilized. Computer system 1300 may represent or form a part of a pattern-matching architecture (e.g., CPMP acceleration hardware 104) or a network protection device.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1300 includes a bus 1330, a processor 1305, communication port 1310, a main memory 1315, a removable storage media 1340, a read only memory 1320 and a mass storage 1325. A person skilled in the art will appreciate that computer system 1300 may include more than one processor and communication ports.

Examples of processor 1305 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 1305 may include various modules associated with context based packet pattern matching system 300 as described with reference to FIG. 3. For example, processor 1305 may include one or more of pre-matching module 306 and/or correlation module 308.

Communication port 1310 can be any of an RS-232 port for use with a modem based dialup connection, a 10/100 Ethernet port, a Gigabit or 10 Gigabit port using copper or fiber, a serial port, a parallel port, or other existing or future ports. Communication port 1310 may be chosen depending on a network, such a Local Area Network (LAN), Wide Area Network (WAN), or any network to which computer system 1300 connects.

Memory 1315 can be Random Access Memory (RAM), or any other dynamic storage device commonly known in the art. Read only memory 1320 can be any static storage device(s) such as, but not limited to, a Programmable Read Only Memory (PROM) chips for storing static information such as start-up or BIOS instructions for processor 1305.

Mass storage 1325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1330 communicatively couples processor(s) 1305 with the other memory, storage and communication blocks. Bus 1330 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1305 to system memory.

Optionally, operator and administrative interfaces, such as a display, keyboard, and a cursor control device, may also be coupled to bus 1330 to support direct operator interaction with computer system 1300. Other operator and administrative interfaces can be provided through network connections connected through communication port 1310.

Removable storage media 1340 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

What is claimed is:

1. A method comprising:
   receiving, by a first stage of a context-aware pattern matching and parsing (CPMP) hardware accelerator of a network security device, a packet stream;
   identifying, by the first stage, a plurality of candidate packets within the packet stream that each satisfy one or more pre-match conditions relating to a set of Intrusion Prevention System (IPS) or Application Delivery Controller (ADC) rules by performing a pre-matching process on packets within the packet stream;

emitting, by the first stage, information indicative of a candidate rule from the set of IPS or ADC rules for which a full-match process is to be performed with respect to a candidate packet of the plurality of candidate packets selected based on a correlation of results of the pre-matching process;

tokenizing, by the first stage, packet data of the candidate packet to produce matching tokens and corresponding locations of the matching tokens within the candidate packet;

performing, by a second stage of the CPMP hardware accelerator including a plurality of CPMP processors, the full-match process on the candidate packet to determine whether the candidate packet satisfies the candidate rule by fetching and executing special purpose CPMP instructions to perform one or more of (i) context-aware pattern matching on one or more packet field values of the candidate packet, (ii) context-aware string matching on packet data of the candidate packet and (iii) regular expression matching on the packet data based on a plurality of predefined conditions associated with the candidate rule, corresponding contextual information provided by the candidate rule, the matching tokens and the corresponding locations; and providing, by the second stage, results of the full-match process to a general purpose processor of the network security device.

2. The method of claim 1, wherein said identifying, by the first stage, a plurality of candidate packets within the packet stream that each satisfy one or more pre-match conditions relating to a set of IPS or ADC rules comprises performing string matching and overflow pattern matching on the packets to identify the plurality of candidate packets, wherein the plurality of candidate packets match one or more strings or over-flow patterns associated with the set of IPS or ADC rules.

3. The method of claim 1, further comprising prior to said receiving, by a first stage of a CPMP hardware accelerator of a network security device, a packet stream:

receiving the packet stream by the general purpose processor; and offloading, by the general purpose processor, performance of one or more tasks to the CPMP hardware accelerator by causing the packet stream to be transferred to the CPMP hardware accelerator.

4. The method of claim 1, further comprising when the candidate packet is determined to satisfy the candidate rule, then causing the candidate packet and the information indicative of the candidate rule to be made available to the general purpose processor.

5. The method of claim 1, wherein the plurality of predefined conditions comprise one or more of field-level constraints, protocol-level constraints, string-level constraints and character-level constraints.

6. The method of claim 1, wherein said performing, by the first stage, a pre-matching process further comprises performing passive matching of overflow patterns that occur between characters or strings within packet data of packets within the packet stream.

7. The method of claim 6, wherein the passive matching is conducted based on an output of a string-level matching process.

8. The method of claim 1, wherein said performing, by the first stage, a pre-matching process further comprises performing active matching of overflow patterns that occur between at least two characters within packet data of packets within the packet stream.

9. The method of claim 1, wherein said performing, by the first stage, a pre-matching process further comprises performing symbol content address memory matching.

10. The method of claim 1, wherein the special purpose CPMP instructions are fetched from an off-chip storage device.

11. The method of claim 1, wherein the special purpose CPMP instructions comprise instructions for sequentially or in parallel performing one or more of exact character matching, negative character matching, wild card matching, string matching, field matching and range matching.

12. The method of claim 1, wherein the special purpose CPMP instructions are fetched from one or more instruction caches.

* * * * *